United States Patent
De Wergifosse

(10) Patent No.: US 8,810,179 B2
(45) Date of Patent: Aug. 19, 2014

(54) METHOD AND DEVICE FOR CONTROLLING A POLYPHASE ELECTRICAL MACHINE

(75) Inventor: Eric De Wergifosse, Saint Augustin (FR)

(73) Assignee: Hispano Suiza, Colombes (FR)

( * ) Notice: Subject to any disclaimer, the term of this patent is extended or adjusted under 35 U.S.C. 154(b) by 167 days.

(21) Appl. No.: 13/575,204

(22) PCT Filed: Jan. 6, 2011

(86) PCT No.: PCT/FR2011/050016
§ 371 (c)(1),
(2), (4) Date: Sep. 27, 2012

(87) PCT Pub. No.: WO2011/092408
PCT Pub. Date: Aug. 4, 2011

(65) Prior Publication Data
US 2013/0009580 A1    Jan. 10, 2013

(30) Foreign Application Priority Data

Jan. 28, 2010    (FR) ..................................... 10 50582

(51) Int. Cl.
*H02P 6/14*    (2006.01)
(52) U.S. Cl.
USPC .................. 318/400.26; 318/400.21; 318/811
(58) Field of Classification Search
CPC ....................................................... B60L 3/003
USPC ................. 318/400.26, 400.21, 811
See application file for complete search history.

(56) References Cited

U.S. PATENT DOCUMENTS

| | | | | |
|---|---|---|---|---|
| 7,649,335 | B2 * | 1/2010 | Ishikawa et al. | 320/104 |
| 8,344,555 | B2 * | 1/2013 | Ichikawa et al. | 307/115 |
| 8,415,825 | B2 * | 4/2013 | Hirose | 307/9.1 |
| 8,543,271 | B2 * | 9/2013 | Yamamoto et al. | 701/22 |
| 2008/0130182 | A1 | 6/2008 | Anderson et al. | |
| 2012/0055727 | A1 * | 3/2012 | Omiya et al. | 180/279 |

OTHER PUBLICATIONS

Welchko, Brian, et al., "Fault Tolerant Three-Phase AC Motor Drive Topologies; A Comparison of Features, Cost, and Limitations," Electric machines and Drives Conference, IEEE, vol. 1, pp. 593-546, (Jun. 1, 2003), XP-010644859.

(Continued)

*Primary Examiner* — Erick Glass
(74) *Attorney, Agent, or Firm* — Oblon, Spivak, McClelland, Maier & Neustadt, L.L.P.

(57) ABSTRACT

A polyphase electrical machine controlled by at least two parallel inverters, each including a number of branches equal to a number of phases of the machine and controlled by PWM. When detecting an inverter branch is faulty, the faulty branch is isolated and the phase in question is powered by each corresponding other inverter branch. The PWM is modified to make power switches of each other branch conductive in succession, without switching while absolute value of the current of the phase in question is greater than or equal to a threshold of 80% to 120% of $(n-1)I_{max}/n$, n is number of inverters and $I_{max}$ is maximum magnitude of the phase current. It is thus possible to continue generating substantially sinusoidal voltages on each of the phases, while avoiding overdimensioning the power switches to ensure in event of a fault they can deliver currents of amplitude higher than in normal operation.

13 Claims, 7 Drawing Sheets

(56) References Cited

OTHER PUBLICATIONS

Ribeiro, R.L.A., et al., "Compensation Strategies in the PWM-VSI Topology for a Fault Tolerant Induction Motor Drive System," 4th IEEE International Symposium on Diagnostics for Electric Machines, Power Electronics and Drives, pp. 211-216, (Aug. 24 to 26, 2008), XP-010659931.

International Search Report Issued Mar. 28, 2011 in PCT/FR11/050016 Filed Jan. 6, 2011.

* cited by examiner

METHOD AND DEVICE FOR CONTROLLING A POLYPHASE ELECTRICAL MACHINE

BACKGROUND OF THE INVENTION

The invention relates to controlling a polyphase electrical machine by means of a plurality of inverters in parallel.

The invention applies more particularly to situations in which such control must present a high degree of reliability, e.g. in the field of aviation.

A known device for controlling a three-phase electrical machine is shown in FIG. 1. The device has two three-phase inverters 1 delivering respective alternating currents (AC) $I_a$, $I_b$, and $I_c$ to the phase windings of the electrical machine 4, each inverter supplying about half of each phase current. Each inverter has switches 5 in a bridge circuit, e.g. power transistors. Each inverter has three branches 6, each comprising two power switches 5 connected in series between two opposite terminals +V and −V of a direct current (DC) electrical power supply, and connected to opposite sides of a point 7 that is connected to a respective phase of the electrical machine. A three-pole isolating switch 8 is connected between each inverter and the electrical machine. A circuit 9 controls the switching of the power switches 5 via driver circuits in order to modulate the DC power supply so as to produce alternating currents $I_a$, $I_b$, and $I_c$. Typically, use is made of pulse-width modulation (PWM).

In the event of an inverter branch having a fault, the faulty inverter is isolated by opening the associated isolating switch, and the phase currents must then be delivered in full by the other inverter. Each branch of the other inverter then conveys all of the corresponding phase current, and no longer only half of it. The power switches must therefore be designed to be capable of switching a current having an amplitude that is twice that of the current that they normally convey (when there is no fault).

Another embodiment of a known device for controlling a three-phase electrical machine is shown in FIG. 2. This other embodiment differs from that of FIG. 1 by the presence of an additional inverter with its associated isolating switch. In normal operation, two inverters are in operation, each delivering respective halves of the phase currents, while the third inverter is isolated. In the event of an inverter branch having a fault, the faulty inverter is isolated by opening the associated isolating switch, and the additional inverter is put into operation with its associated isolating switch being closed.

In both of the above configurations, a large amount of overdimensioning is necessary, either in terms of the switching ability of the power switches, or else in terms of the number of inverters.

OBJECT AND SUMMARY OF THE INVENTION

An object of the invention is to enable a polyphase electrical machine to be controlled by a plurality of inverters in parallel with a high degree of reliability and without requiring such overdimensioning.

According to an aspect of the invention, this object is achieved by a method of controlling a polyphase electrical machine by means of at least two polyphase inverters in parallel, each inverter comprising a number of branches equal to the number of phases of the electrical machine, and each branch comprising two power switches connected in series between two opposite terminals of a DC electrical power supply and connected to opposite sides of a point that is connected to an electrical phase of the electrical machine, the method comprising controlling the inverters by pulse-width modulation so as to control the switching of the power switches, and detecting an inverter branch fault, in which method, in response to detecting an inverter branch that is faulty, the faulty branch is isolated, the phase of the electrical machine corresponding to the faulty branch is powered by the or each other corresponding inverter branch, and the pulse-width modulation control is modified, in particular to make the power switches of the or each other corresponding inverter branch conductive in succession and without switching while the absolute value of the phase current concerned is greater than or equal to a threshold lying in the range 80% to 120% of $$\frac{n-1}{n} I_{max},$$

where $\underline{n}$ is the number of inverters, and $I_{max}$ is the absolute value of the maximum phase current, and while continuing to generate substantially sinusoidal voltage on each phase of the machine.

Thus, in the or each inverter branch that takes over the phase current fraction that was previously provided by the faulty branch, the power switches are not required to switch while the current flowing through the or each branch is of an amplitude that is greater than a threshold substantially equal (to within 20%) to the maximum current value in the absence of a fault. Naturally, for the other inverter branches that are in operation, it is also necessary to modify the PWM compared with that applied prior to the fault being detected, so as to continue to deliver balanced alternating phase currents.

The method of the invention is thus remarkable in that it can mitigate a faulty inverter branch without overdimensioning the power switches so as to enable them to switch currents of amplitude that is greater than during normal operation, and without requiring redundancy in terms of the number of inverters.

Preferably, when controlling a three-phase electrical machine by means of two inverters in parallel, during each period of the phase current corresponding to the faulty inverter branch, the power switches of the corresponding other inverter branch are made conductive in succession and without switching for about ⅓ of said period.

In an embodiment, the faulty inverter branch is isolated by opening a branch isolator switch connected between the inverter branch and the corresponding phase of the electrical machine.

In another embodiment, the faulty inverter branch is isolated by inhibiting driver circuits of the power switches of the faulty branch.

In another aspect of the invention, the invention also provides a control device for controlling a polyphase electrical machine and suitable for implementing the above-defined method.

This object is achieved by a control device comprising:
  at least two polyphase inverters in parallel, each inverter having a number of branches equal to the number of phase currents to be delivered, and each branch having two power switches connected in series between two opposite terminals of a DC electrical power supply and connected to opposite sides of a point connected to a respective phase current output terminal;
  a control circuit for controlling the inverters by pulse-width modulation, controlling the switching of the power switches; and a system for detecting faults of the inverter branches and connected to the control circuit;

in which device, in response to detection of a faulty inverter branch, the control circuit of the inverters is arranged to:

isolate the faulty inverter branch so that the current of the corresponding phase is delivered by the or each corresponding other inverter branch; and modify the pulse-width modulation in particular so as to make the power switches of the or each corresponding other inverter branch conductive in succession and without switching while the absolute value of the phase current in question is greater than or equal to a threshold lying in the range 80% to 120% of $$\frac{n-1}{n} I_{max},$$

where $\underline{n}$ is the number of inverters, and $I_{max}$ is the absolute value of the maximum phase current, and while continuing to generate a substantially sinusoidal voltage on each phase of the machine.

Advantageously, when controlling a three-phase electrical machine by means of two inverters in parallel, the control circuit is arranged to respond to detecting a faulty inverter branch by modifying the pulse-width modulation, in particular so as to cause the power switches of the corresponding other inverter branch to be conductive in succession and without switching for respective durations equal to about ⅓ of the period of the phase current.

In an embodiment, the control device includes respective isolating switches connected to each of the inverter branches in order to be capable of isolating any inverter branch selectively from the corresponding phase current outlet.

In another embodiment, the power switches of the inverter branches are controlled via driver circuits and the inverter control circuit is arranged to respond to detecting a faulty branch by inhibiting the operation of the driver circuits of the power switches of the faulty branch.

In yet another of its aspects, the invention provides a system for starting an aeroengine, the system comprising a polyphase electrical machine controlled to operate in motor mode to drive a shaft of the engine, and a device as defined above for controlling the polyphase electrical machine.

BRIEF DESCRIPTION OF THE DRAWINGS

Other features and advantages of the invention appear on reading the following description given by way of non-limiting indication and with reference to the accompanying drawings, in which.

DETAILED DESCRIPTION OF EMBODIMENTS OF THE INVENTION

Figure 1:
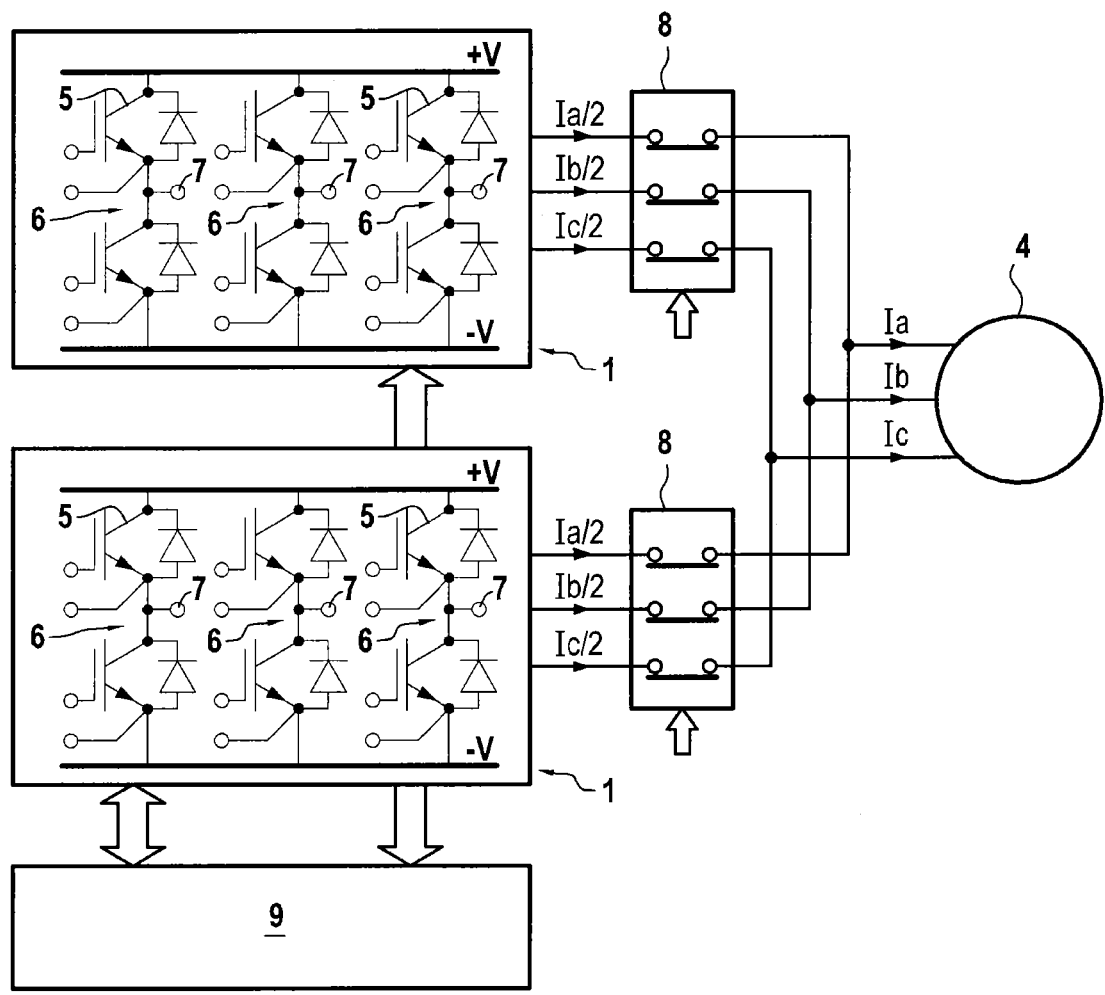
FIGS. 1 and 2, described above, are very diagrammatic views of two embodiments of prior art high-reliability control devices for a polyphase electrical machine.
Figure 2:
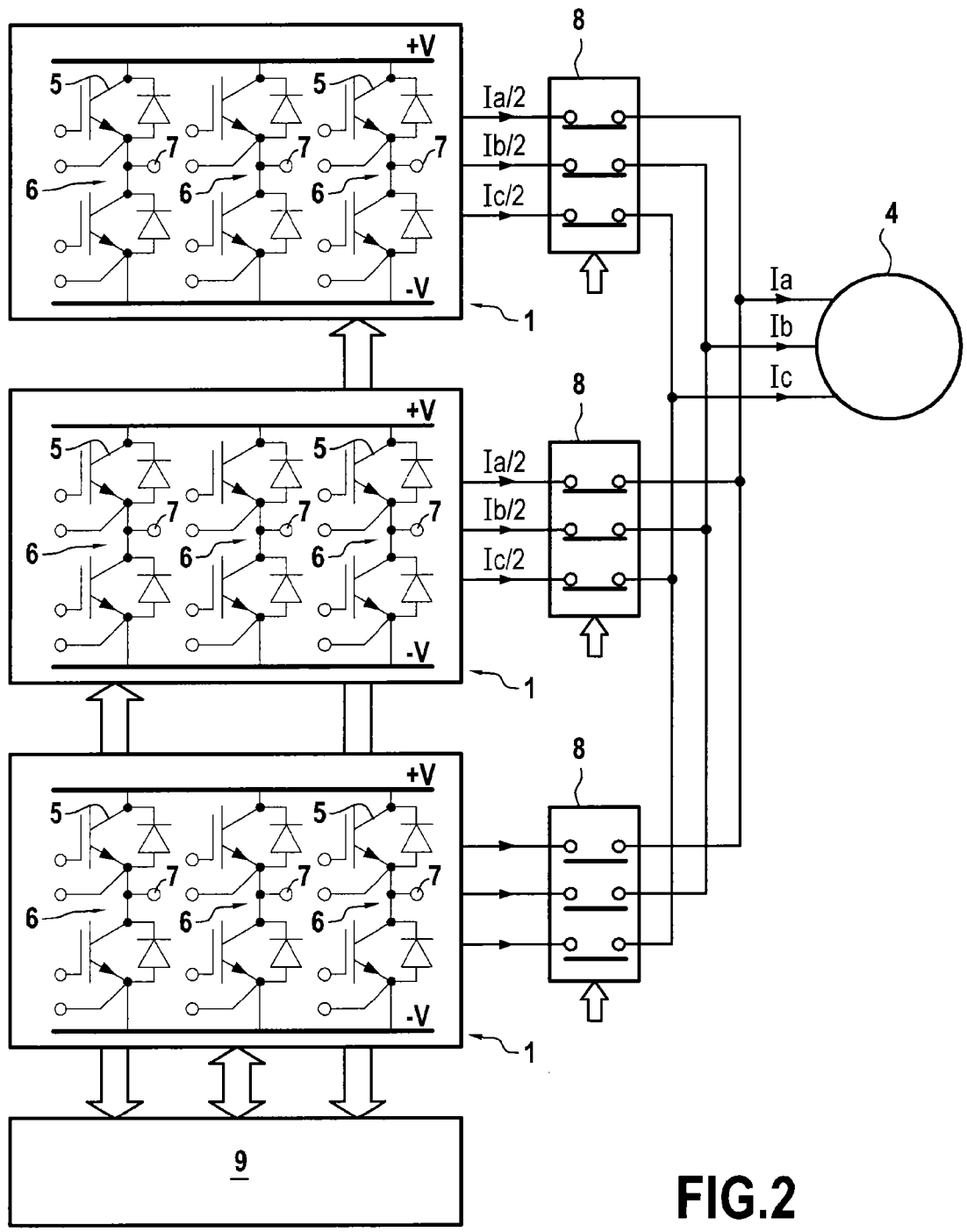
Figure 3:
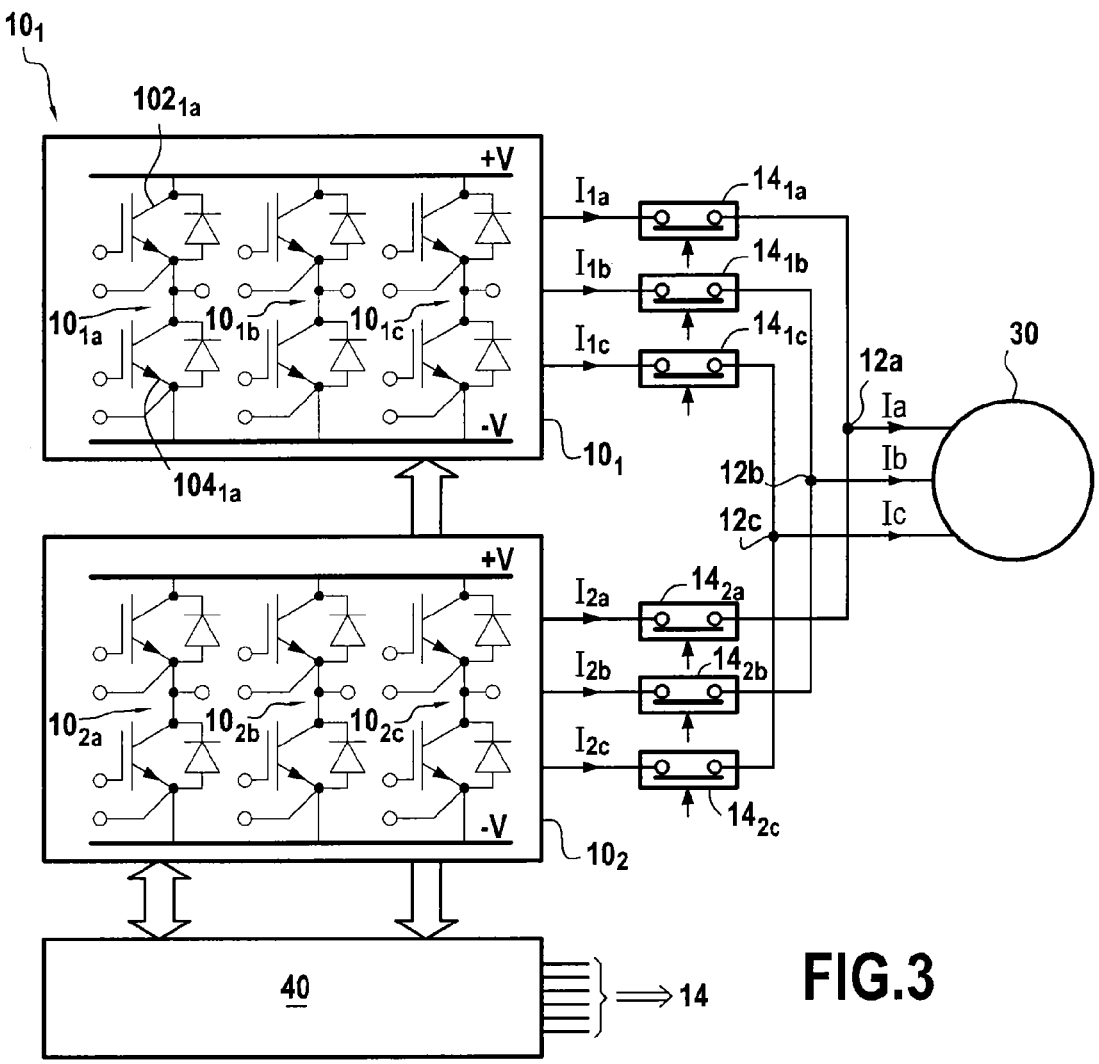
FIG. 3 is a highly diagrammatic view of an embodiment of a control device of the invention for a polyphase electrical machine.

FIG. 3 is a diagram of an embodiment of a control device 10 of the invention for controlling a three-phase electrical machine 30 by means of two three-phase inverters $10_1$ and $10_2$ in parallel.

As mentioned above, the invention applies in particular to the field of aviation. The electrical machine 30 may be a machine in a system for starting an aeroengine, e.g. a turbine engine. The electrical machine is then mechanically coupled to a shaft of the engine in order to drive it on starting, the machine then being controlled in electric motor mode. The electrical machine 30 may also be a machine used for starting an auxiliary power unit (APU) or for activating actuators.

The inverter $10_1$ has three branches $10_{1a}$, $10_{1b}$, and $10_{1c}$ that deliver alternating currents $I_{1a}$, $I_{1b}$, and $I_{1c}$ at respective output terminals $12_a$, $12_b$, and $12_c$ of the control device. In similar manner, the inverter $10_2$ has three branches $10_{2a}$, $10_{2b}$, and $10_{2c}$ that deliver alternating currents $I_{2a}$, $I_{2b}$, and $I_{2c}$ on the output terminals $12_a$, $12_b$, and $12_c$, respectively. The phase currents $I_a$, $I_b$, and $I_c$ delivered to the stator windings of the electrical machine 30 are such that $I_a=I_{1a}+I_{2a}$, $I_b=I_{1b}+I_{2b}$, and $I_c=I_{1c}+I_{2c}$. The inverters $10_1$ and $10_2$ are of similar construction, and in normal operation, they are controlled in the same manner, such that the currents $I_{1a}$ and $I_{2a}$ are substantially in phase and equal to $I_a/2$. Similarly, $I_{1b}$ and $I_{2b}$ are substantially in phase and equal to $I_b/2$, and $I_{1c}$ and $I_{2c}$ are substantially in phase and equal to $I_c/2$.

The inverter branches are all similar. Each branch, e.g. the branch $10_{1a}$ (FIGS. 3 and 4) comprises two switches $102_{1a}$ and $104_{1a}$ that are connected in series between the DC electric power rails +V and −V and that are connected to opposite sides of a point $106_{1a}$ where the current $I_{1a}$ is delivered. The switches $102_{1a}$ and $104_{1a}$ are typically electronic switches formed by power transistors, e.g. insulated gate bipolar transistors (IGBTs). Other types of power switch could be used, e.g. MOSFET, COOLMOS®, JFET transistors, or thyristors. The DC power source is modulated by switching the power transistors $102_{1a}$ and $104_{1a}$ to obtain alternating current $I_{1a}$ of substantially sinusoidal appearance. Typically, use is made of PWM. The switching pulses are applied between the grids and the emitters of the transistors $102_{1a}$ and $104_{1a}$ by means of a driver circuit $108_{1a}$ in order to control successive switching of the transistors, one of them being conductive while the other is non-conductive. Freewheel diodes $110_{1a}$ and $112_{1a}$ are connected between the collectors and the emitters of the transistors $102_{1a}$ and $104_{1a}$ in order to enable the bridge branch to operate in the four quadrants defined by the output voltage and output current axes.

A desaturation detector circuit $114_{1a}$ is connected to the power transistors $102_{1a}$, $104_{1a}$ in order to collect information representative of the voltage between the collector and the emitter of a transistor when it is controlled to take on the conductive state. When this information represents a collector-emitter voltage that is greater than a maximum threshold, then an inverter branch transistor fault signal is issued by the circuit $114_{1a}$.

Figure 5:
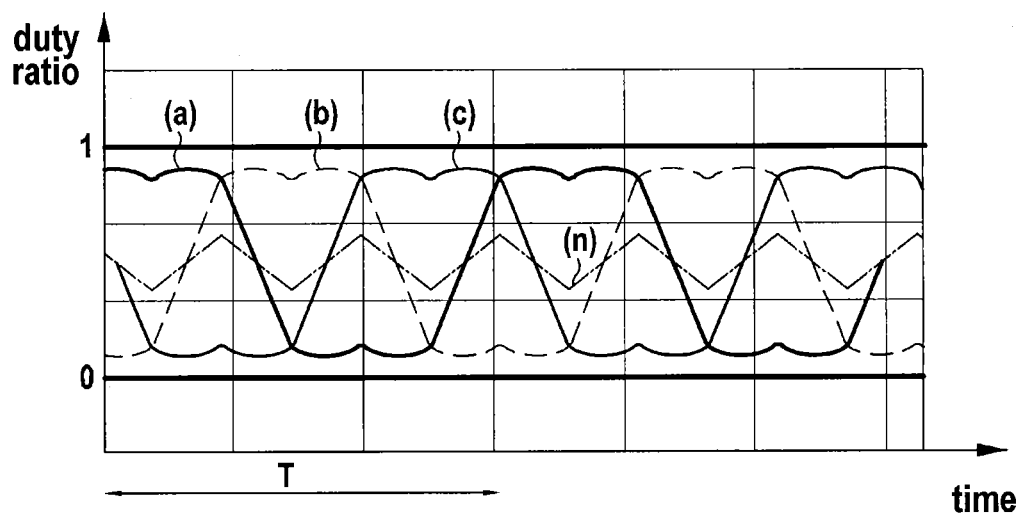
FIG. 5 shows variation in the duty ratio of the pulses controlling the switching of the power switches in the branches of the inverter in the FIG. 3 device, in the absence of any fault.

The circuits $108_{1a}$ and $114_{1a}$ are connected to an inverter control circuit 40 that comprises a pulse generator for performing PWM, e.g. of the vector type. By way of example, the curve (a) of FIG. 5 represents variation in the duty ratio of the switching pulses corresponding to a phase A over the electrical periods of the current of that phase, i.e. the variation in the duty ratio of the pulses applied to one of the power transistors of the branches $10_{1a}$ and $10_{2a}$, the duty ratios of the pulses that control the switching of the other power transistors in the same branches being complementary. The duration T represents the electrical periods of the currents delivered by the inverters. The curves (b) and (c) show variations in the duty ratios of the switching pulses corresponding to the other phases B and C of the electrical machine, while the curve (n) shows the duty ratio corresponding to the neutral point of the electrical machine. The curves (a), (b), and (c) have the same appearance in terms of variation, but they are mutually offset by $2\pi/3$. The appearance of the curves (a), (b), and (c) is not sinusoidal, the PWM being selected to optimize utilization of the potential of the DC electrical power source. The variation in the duty ratio of the neutral point of the electrical machine (curve (n)) shows that substantially sinusoidal voltages are reconstituted between neutral and each of the phases.

A control device for a three-phase electrical machine of the kind described above is itself well known.

In the invention, in the event of a fault being detected in an inverter branch, the faulty branch is selectively isolated, and the PWM is modified to allow the branch corresponding to the same phase in the other inverter to deliver all of the current for the phase in question, but without requiring overdimensioning associated with the need for power switches to switch while they are conveying currents at an amplitude that is greater than in normal operation.

In order to selectively isolate a faulty inverter branch, respective single-pole branch-isolating contactors $14_{1a}$, $14_{1b}$, and $14_{1c}$ are inserted between the branches $10_{1a}$, $10_{1b}$, and $10_{1c}$ and the outputs $12_a$, $12_b$, and $12_c$, and respective single-pole contactors $14_{2a}$, $14_{2b}$, and $14_{2c}$ are inserted between the branches $10_{2a}$, $10_{2b}$, and $10_{2c}$ and the outputs $12_a$, $12_b$, and $12_c$, these various contactors being selectively controlled by the control circuit 40.

Figure 6:
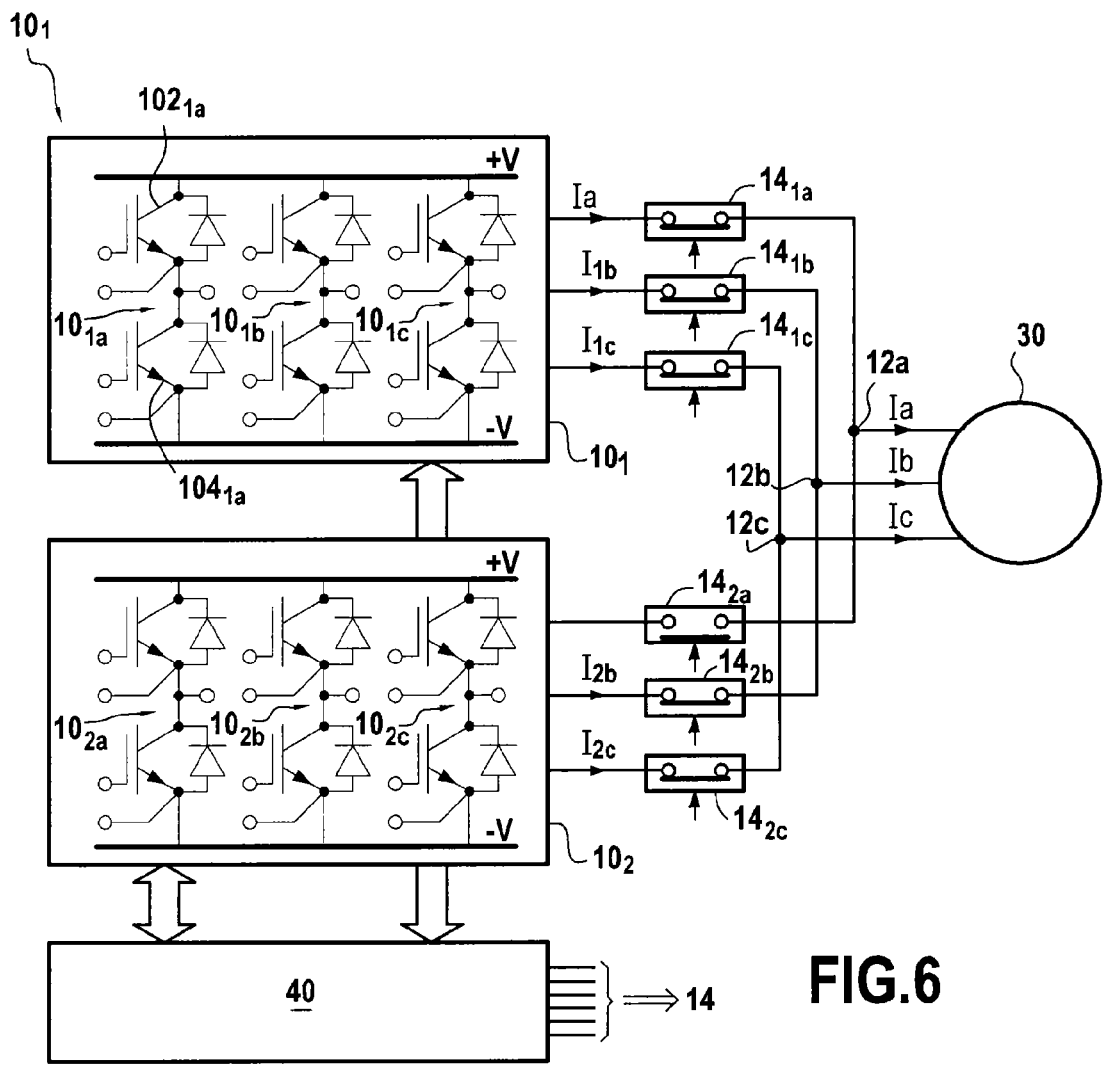
FIG. 6 shows the FIG. 3 control device after detecting a faulty inverter branch.

In the event of a fault being detected in an inverter branch, e.g. the branch $10_{2a}$, the circuit 40 causes the corresponding branch isolating contactor $14_{2a}$ to open, as shown in FIG. 6. All of the current for the phase $I_a$ is then delivered by the branch $10_{1a}$, while the phase currents $I_b$ and $I_c$ continue to be obtained from the respective contributions $I_{1b}$, $I_{2b}$ and $I_{1c}$, $I_{2c}$ of the branches $10_{1b}$, $10_{2b}$ and $10_{1c}$, $10_{2c}$.

The PWM is modified so that the power transistors of the branch $10_{1a}$ are kept conductive without switching so long as the current $I_a$ passing therethrough has an absolute value greater than a threshold substantially equal to $I_{max}/2$, where $I_{max}$ is the maximum absolute value of the phase current. By way of example, the threshold may lie in the range 0.8 ($I_{max}/2$) to 1.2 ($I_{max}/2$).

Figure 7:
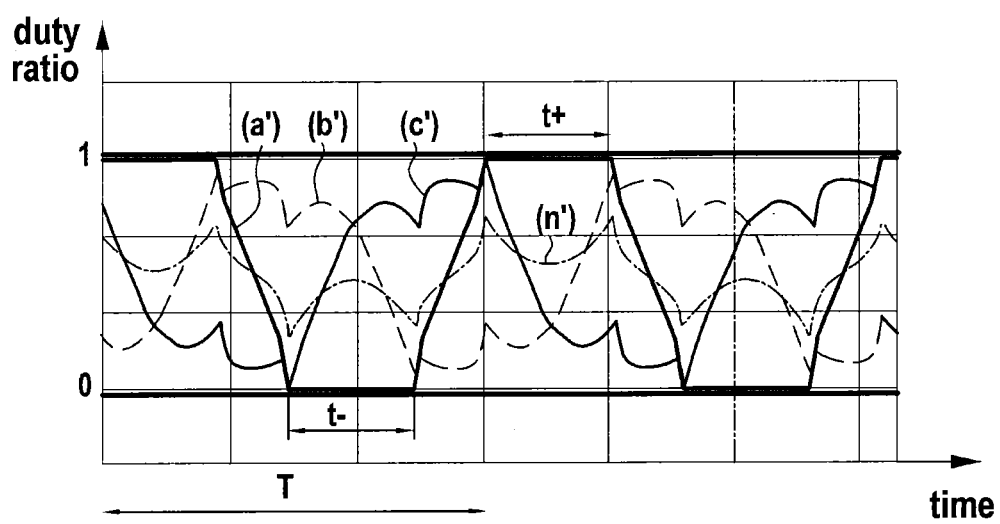
FIG. 7 shows the variation in the duty ratio of the pulses controlling the switching of the switches in the inverter branches of the FIG. 3 device that remain active after detecting that an inverter branch is faulty and isolating it.

The curve (a') of FIG. 7 shows how the duty ratio of the switching pulses corresponding to the phase A vary over time in application of the PWM as modified after detecting a fault in an inverter branch corresponding to the phase A. Each power transistor of the inverter branch taking over all of the current for the phase A is kept conductive without switching for a duration that corresponds to substantially one-third of the period T (which corresponds to the above threshold having a value of about $I_{max}/2$). The ranges t+ and t− correspond, for example, to the durations of conduction without switching of the power transistor $110_{1a}$ situated beside the power supply rail +V and of the transistor $112_{1a}$ situated beside the power supply rail −V, respectively. Thus, over a period T, for T/3 (range t+) the transistor $110_{1a}$ is permanently conductive and the transistor $112_{1a}$ is non-conductive (duty ratio equal to 1), during the following duration T/6, the duty ratio decreases from 1 to 0, during the following T/3, the transistor $112_{1a}$ is permanently conductive and the transistor $110_{1a}$ is non-conductive (duty ratio equal to 0), and during the remaining duration T/6, the duty ratio increases from 0 to 1.

In the above example of a fault detected in the branch $10_{2a}$, the current flowing through the branch $10_{1a}$ is increased, and is normally doubled, relative to nominal operation without a fault. Nevertheless, this does not lead to doubling dissipation since switching losses are reduced compared with nominal operation. With IGBT type power transistors, in which conduction losses are of the same order of magnitude as switching losses, the total dissipation of each power transistor is increased by a ratio of about 1.4. The corresponding increase in junction temperature is acceptable from a reliability point of view since it normally lies within an operating safety margin of the power transistor, and since the fault mode of operation is limited in time to the time required until maintenance action is taken. In addition, because of the presence of ranges without switching, the dissipation in the freewheel diodes of the inverter branch that takes over all of the phase current is greatly reduced.

In FIG. 7, the curves (b') and (c') represent variation in the duty ratios that correspond to the phases B and C of the electrical machine, and the curve (n') represents the variation in the duty ratio of the neutral of the machine. The curves (b') and (c') present variation that is similar in appearance and modified relative to the appearance of the variation of the curves (b) and (c) of FIG. 5 so as to be able to reconstitute substantially sinusoidal variations for the voltages between neutral and the phases. Thus, the modification of the PWM must relate not only to the phase corresponding to the faulty inverter branch, but also to the other phases so as to be able to ensure that these pvariations remain substantially sinusoidal. Preferably, when using the modified PWM, no switching pulse is applied to the faulty branch, and the grid voltage of the power transistors in this branch is kept at a level corresponding to a non-conductive state.

Naturally, FIG. 7 shows one example amongst other possible examples for how PWM can be modified after a fault.

Figure 8:
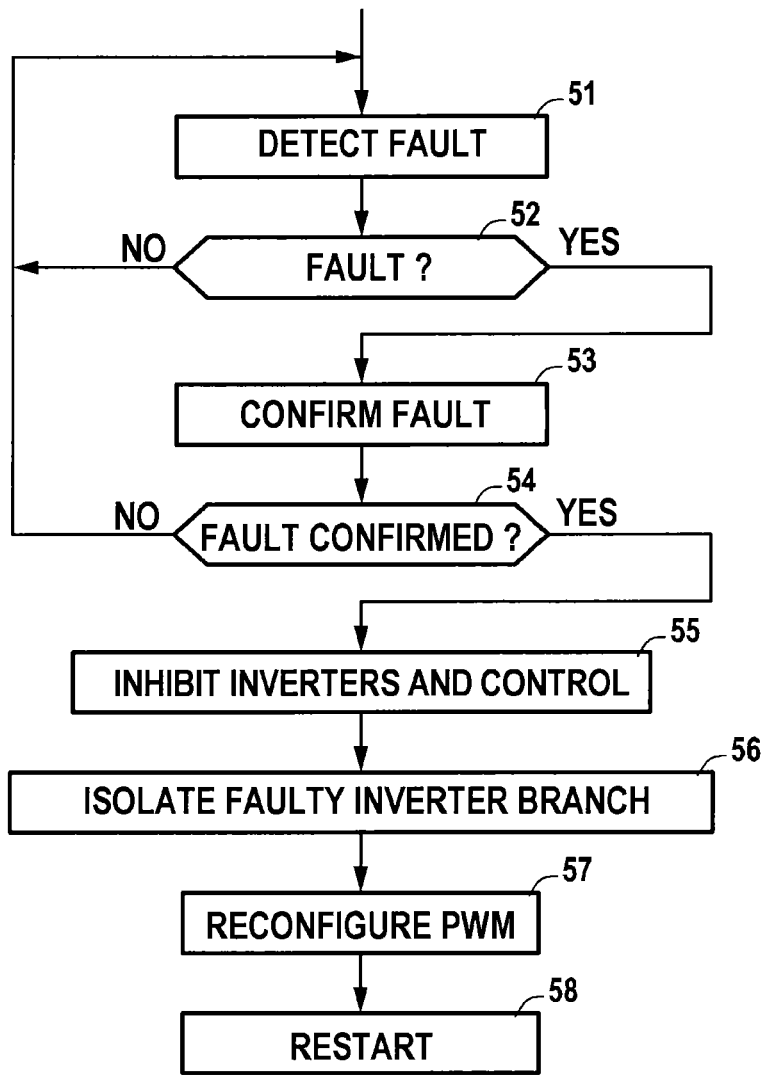
FIG. 8 shows the successive steps in a sequence of detecting an inverter branch fault and of processing the fault.

FIG. 8 shows the successive steps of an example of a process for detecting and managing a fault, which process may be implemented by the control circuit 40.

Figure 4:
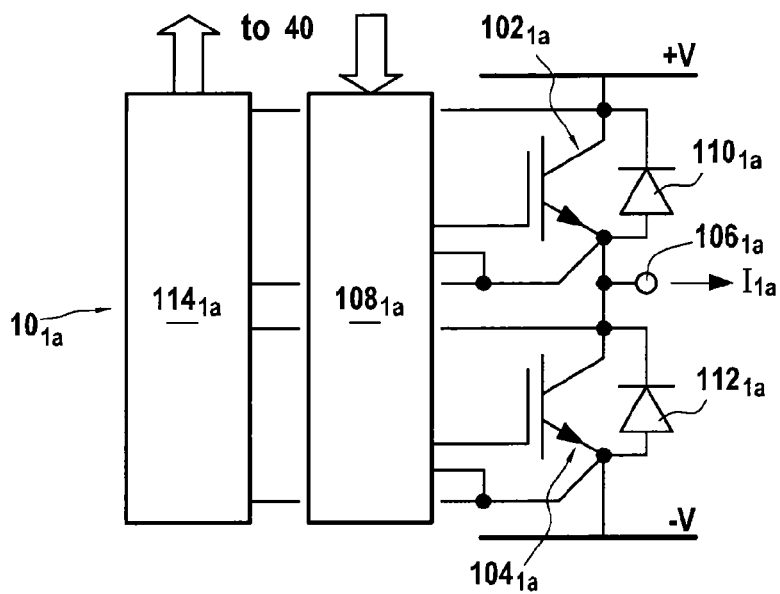
FIG. 4 is a detailed view of one inverter branch of the FIG. 3 device.

The fault detection step 51 comprises monitoring any signals issued by the desaturation detector circuits associated with the inverter branches, such as the circuit $114_{1a}$ of FIG. 4. In a variant, an inverter branch fault could be detected by monitoring the current level produced by that branch.

When a fault is detected (test 52), it may be confirmed (step 53). The fault may be confirmed by interrupting the operation of the inverters and then putting them back into operation in order to observe whether or not the fault persists. When faults are detected by detecting desaturation of power transistors, it is possible, for confirmation purposes, to measure the current produced by the inverter branch that is suspected of being faulty.

When the fault is confirmed (test 54), the operation of the inverters and their control is inhibited, e.g. by interrupting the PWM (step 55), and the isolating switch associated with the faulty branch is opened (test 56). It should be observed that the presence of isolating switches is preferred so that in the event of a short-circuit fault of a power transistor, that fault is prevented from affecting the operation of the remainder of the device. Nevertheless, the presence of such switches could be omitted if the probability of such a short circuit is negligible relative to the expected reliability of operation.

Thereafter, the PWM is reconfigured and the PWM as modified in this way is applied by restarting the inverter branches other than the faulty branch (step 57).

Figure 9:
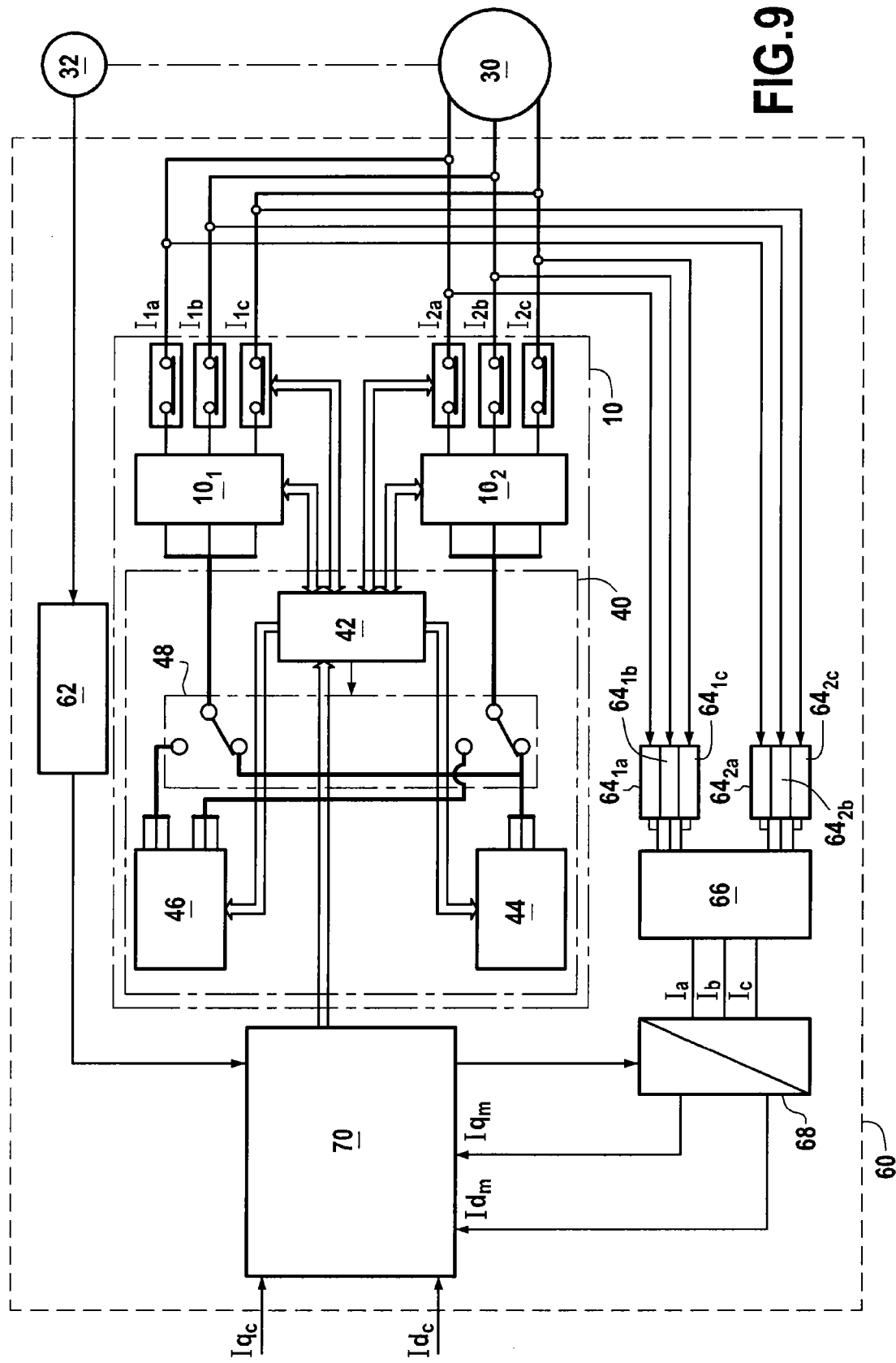
FIG. 9 is a diagram showing an inverter control circuit in a control device in an embodiment of the invention for controlling a synchronous electrical machine with torque regulation.

FIG. 9 shows an example of how the FIG. 3 control device can be incorporated in a torque regulator 60 for controlling a synchronous electrical machine 30.

A circuit 62 is connected to an angular position sensor 32 associated with a shaft of the electrical machine 30, or with a shaft constrained to rotate together therewith, in order to provide information representative of the speed of rotation and of the angular position of the rotor of the electrical machine 30.

Circuits $64_{1a}$, $64_{1b}$, and $64_{1c}$ are connected to current sensors mounted on the output lines of the branches of the inverter $10_1$ in order to deliver information representative of the currents $I_{1a}$, $I_{1b}$, and $I_{1c}$. Similarly, circuits $64_{2a}$, $64_{2b}$, and $64_{2c}$ are connected to current sensors mounted in the output lines of the branches of the inverter $10_2$ in order to provide information representative of the currents $I_{1a}$, $I_{2b}$, and $I_{2c}$. Summing circuits 66 deliver information representative of the phase currents $I_a$, $I_b$, and $I_c$. This information is received by a calculation circuit 68 that responds to the phase current values to generate information $Iq_m$ and $Id_m$ representative of the measured torque current and the measured flux current of the electrical machine.

A regulator circuit 70 provides the inverter control circuit 40 with voltage level and angle information for each phase of the machine so as to servo-control the values of $Iq_m$ and $Id_m$ to setpoint values $Iq_c$ (representing the setpoint torque) and $Id_c$, while ensuring an optimum position for the stator flux relative to the angular position of the rotor in the electrical machine 30. For this purpose, the regulator circuit 70 receives the information $Iq_m$ and $Id_m$ delivered by the calculation circuit 68, the setpoint information $Iq_c$ and $Id_c$, and the speed and angular position information delivered by the circuit 62.

The principle of a torque regulator as described above is itself well known.

The setpoint information concerning voltages and frequency as received by the inverter control circuit 40 is used by a digital control unit 42 to control an assembly 44 for generating pulse-width modulated pulses in the absence of a fault being detected, i.e. a nominal PWM generator, which pulses are applied in parallel to the respective branches of the inverters $10_1$ and $10_2$.

A PWM mode changeover from nominal PWM mode to modified PWM mode may be implemented by the digital control unit 42 in order to disconnect the nominal PWM generator 44 and put into operation a modified PWM generator 46, the changeover between the two PWM modes being represented by a switch 48. The modified PWM generator has outputs associated with the branches of the inverters $10_1$ and $10_2$. In the event of a fault being detected, the nominal PWM generator 44 is deactivated, the modified PWM generator 46 is programmed under the control of the digital control unit 42 to generate pulses on its output that are modulated in width as a function of which inverter branch is faulty, and then changeover to the modified PWM generator 46 is operated.

Above, the description relates to controlling a three-phase machine having two inverters in parallel.

Naturally, the invention is applicable to polyphase machines having a number of phases greater than three, by adapting the number of inverter branches.

The invention is also applicable to controlling a polyphase machine by more than two inverters in parallel, each inverter branch then producing substantially 1/n of the current for the corresponding phase, where n is the number of inverters. In the event of an inverter branch fault, the phase current concerned must then be taken over by the corresponding n−1 other branches of the other inverters. The PWM is modified so that in each of those other branches, the power switches are kept conductive without switching so long as the magnitude of the absolute value of the current passing through them is greater than a threshold substantially equal to $$\frac{n-1}{n}I_{max},$$

where $I_{max}$ is the absolute value of the maximum phase current. By way of example, it is possible to select a threshold lying in the range 80% to 120% of $$\frac{n-1}{n}I_{max}.$$

The invention claimed is:

1. A method of controlling a polyphase electrical machine by at least two polyphase inverters in parallel, each inverter comprising a number of branches equal to a number of phases of the electrical machine, and each branch comprising two power switches connected in series between two opposite terminals of a DC electrical power supply and connected to opposite sides of a point that is connected to an electrical phase of the electrical machine, the method comprising:
controlling the inverters by pulse-width modulation so as to control switching of the power switches, and detecting an inverter branch fault;
wherein in response to detecting an inverter branch of a first inverter that is faulty, the faulty branch is isolated, the phase of the electrical machine corresponding to the faulty branch is powered by a corresponding inverter branch of a second inverter, and the pulse-width modulation control is modified, or to make the power switches of the corresponding inverter branch of the second inverter conductive in succession and without switching while the absolute value of a phase current concerned is greater than or equal to a threshold lying in a range of 80% to 120% of $$\frac{n-1}{n}I_{max},$$

wherein n is the number of inverters and $I_{max}$ is the absolute value of the maximum phase current, and while continuing to generate substantially sinusoidal voltage on each phase of the machine.

2. A method according to claim 1, for controlling a three-phase electrical machine by two three-phase inverters in parallel, wherein during each period of the phase current corresponding to the faulty inverter branch, the power switches of the corresponding inverter branch of the second inverter are made conductive in succession and without switching for about ⅓ of the period.

3. A method according to claim 1, wherein the faulty inverter branch is isolated by opening a branch isolator switch connected between the inverter branch and the corresponding phase of the electrical machine.

4. A method according to claim 1, wherein the faulty inverter branch is isolated by inhibiting driver circuits of the power switches of the faulty branch.

5. A method according to claim 2, wherein the faulty inverter branch is isolated by opening a branch isolator switch connected between the inverter branch and the corresponding phase of the electrical machine.

6. A method according to claim 2, wherein the faulty inverter branch is isolated by inhibiting driver circuits of the power switches of the faulty branch.

7. A device for controlling a polyphase electrical machine, the device comprising:
   at least two polyphase inverters in parallel, each inverter comprising a number of branches equal to a number of phase currents to be delivered, and each branch comprising two power switches connected in series between two opposite terminals of a DC electrical power supply and connected to opposite sides of a point connected to a respective phase current output terminal;
   a control circuit for controlling the inverters by pulse-width modulation, controlling switching of the power switches; and
   a system for detecting faults of the inverter branches and connected to the control circuit;
   wherein, in response to detection of a faulty inverter branch of the first inverter, the control circuit of the inverters is configured to:
   isolate the faulty inverter branch of the first inverter so that the current of the corresponding phase is delivered by a corresponding inverter branch of a second inverter; and
   modify the pulse-width modulation or to make the power switches of the corresponding inverter branch of the second inverter conductive in succession and without switching while the absolute value of the phase current in question is greater than or equal to a threshold lying in a range of 80% to 120% of $$\frac{n-1}{n}I_{max},$$

wherein n is the number of inverters and $I_{max}$ is the absolute value of the maximum phase current, and while continuing to generate a substantially sinusoidal voltage on each phase of the machine.

8. A device according to claim 7, for controlling a three-phase electrical machine by two three-phase inverters in parallel, wherein, in response to detecting a faulty inverter branch, the control circuit of the inverters is configured to modify the pulse-width modulation, or to cause the power switches of the corresponding inverter branch of the second inverter to be conductive in succession and without switching for respective durations equal to about ⅓ of the period of the phase current.

9. A device according to claim 7, further comprising respective isolating switches connected to each of the inverter branches to be configured to isolate any inverter branch selectively from a corresponding phase current outlet.

10. A device according to claim 7, wherein the power switches of the inverter branches are controlled via driver circuits and the inverter control circuit is arranged to respond to detecting a faulty branch by inhibiting the operation of the driver circuits of the power switches of the faulty branch.

11. A device according to claim 8, further comprising respective isolating switches connected to each of the inverter branches to be configured to isolate any inverter branch selectively from a corresponding phase current outlet.

12. A device according to claim 8, wherein the power switches of the inverter branches are controlled via driver circuits and the inverter control circuit is arranged to respond to detecting a faulty branch by inhibiting the operation of driver circuits of the power switches of the faulty branch.

13. A system for starting an aeroengine, the system comprising:
   a polyphase electrical machine controlled to operate in motor mode to drive a shaft of the engine; and
   a device according to claim 7 for controlling the polyphase electrical machine.

* * * * *